Figure 1:
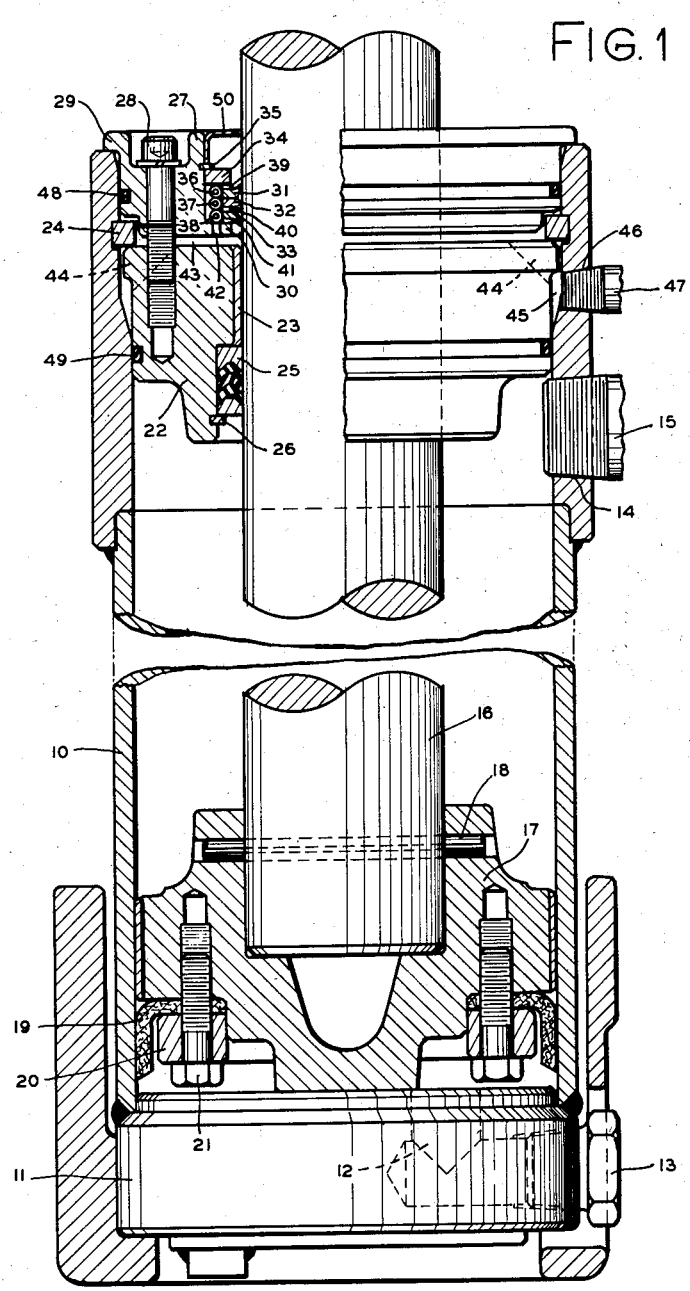

March 6, 1956 R. LAPSLEY 2,737,404
CYLINDER CONSTRUCTION

Filed Dec. 5, 1952 2 Sheets-Sheet 1

INVENTOR.
ROBERT LAPSLEY
BY
Brown, Jackson, Boettcher & Dienner
ATTYS.

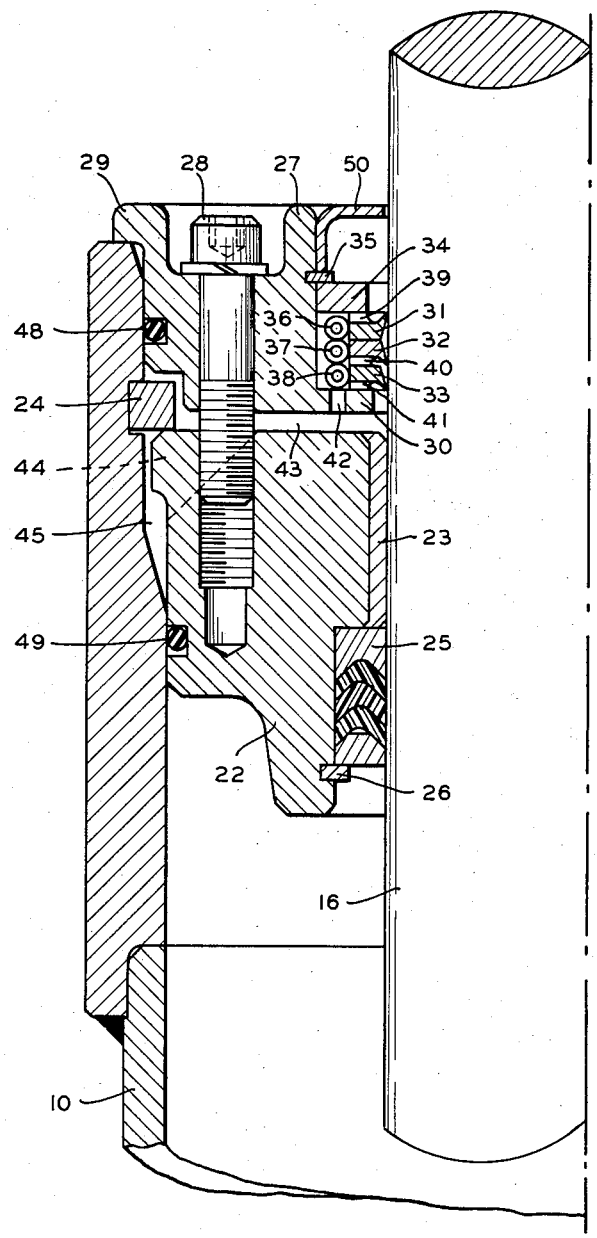

United States Patent Office 2,737,404
Patented Mar. 6, 1956

2,737,404

CYLINDER CONSTRUCTION

Robert Lapsley, Buchanan, Mich., assignor to Clark Equipment Company, Buchanan, Mich., a corporation of Michigan Application December 5, 1952, Serial No. 324,335

2 Claims. (Cl. 286—27)

My present invention relates generally to cylinder constructions and, more particularly, is directed to closure means for the piston rod end of the cylinder of a hydraulic piston and cylinder assembly.

In order to obtain optimum service from hydraulic piston and cylinder assemblies which, for example, may be embodied in industrial trucks, it is necessary to eliminate oil leakage from the cylinder as the piston rod is extended and the entrance of foreign material into the cylinder as the piston rod is retracted. Substances most likely to impair proper performance are abrasives, such as grit, dust, and sand; foreign materials, such as iron, brass, and steel chips; and corrosive agents, such as acids and water. In a typical installation of a hydraulic piston and cylinder assembly, no suitable closure means is provided about the piston rod and consequently fluid adhering to the periphery of the piston rod is moved out of the cylinder where it serves to collect dirt and dust. This collection of dirt and dust, upon retraction of the piston rod, is scraped off on the outside of the lift cylinder. In a very short time the cylinder becomes encased in dirt and grime. This condition detracts from the appearance of the hydraulic assembly and is responsible for high-cost maintenance of the latter.

It is an object of my present invention to provide closure means at the piston rod end of the cylinder of a hydraulic piston and cylinder assembly which is adapted to remove substantially all of the hydraulic fluid from the periphery of the piston rod as the latter is extended to thereby prevent oil leakage out of the cylinder. Since the piston rod is prevented from carrying fluid out of the cylinder, the exposed portion of the piston rod does not have any special affinity for dirt and dust. Thus the amount of dirt and dust which is scraped onto the cylinder from the piston rod, upon retraction of the latter, is reduced to a minimum.

It is another object of my present invention to provide closure means, as described, which includes suitable fluid passageway means for directing the hydraulic fluid, collected from the periphery of the piston rod, to a drain line having connection with the sump tank of the fluid circuit of the hydraulic piston and cylinder assembly.

It is a further object of my present invention to provide closure means, of the character noted, which will remove foreign material collected on the periphery of the piston rod extending outwardly of the cylinder, while the piston rod is being retracted, so as to prevent the entrance of foreign material into the cylinder.

It is a still further object of my present invention to provide the closure means described with suitable fluid passageways for directing the foreign material, collected at the outer periphery of the piston rod, to the drain line having connection with the sump tank of the fluid circuit.

Now, in order to acquaint those skilled in the art with the manner of constructing and using cylinder constructions in accordance with the principles of my present invention, I shall describe in connection with the accompanying drawing a preferred embodiment of my present invention.

In the drawing:

Figure 1 is a vertical sectional view of a hydraulic piston and cylinder assembly with which the closure means of my present invention is embodied; and Figure 2 is an enlarged vertical sectional view of the closure means of Figure 1.

Referring now to the drawing, there is shown a vertically extending cylinder 10 which has suitably secured, as by welding, to its lower end, a head closure member 11. The closure member 11 has a fluid port 12 formed therein through which fluid under pressure may be introduced into the interior of the cylinder 10. Threaded into the end of the fluid port 12 is a pipe 13 which is adapted to be placed selectively in communication with a source of fluid under pressure. A second fluid port 14 is formed through the wall of the cylinder 10 and fluid under pressure is adapted to be selectively introduced therethrough into the interior of the cylinder 10. Threaded into the opening 14 is a pipe 15 which is adapted to be placed selectively in communication with a source of fluid under pressure.

Disposed within the cylinder 10 is a piston rod 16 having a piston head 17 secured to its lower end by means of a pin 18. The piston head 17 has secured to its lower end an annular cup-shaped ring 19 which is preferably formed of leather. The ring 19 is secured to the piston head 17 by means of an annular ring 20 held in position by studs 21.

At the upper end of the cylinder 10, there is provided the piston rod guide assembly and closure means of my present invention which comprises an annular guide member 22 having a liner or bushing member 23 in which the piston rod 16 is guided when extended or retracted. The guide member 22 is held in position within the cylinder 10 by means of a split-ring 24. Also disposed about the periphery of the piston rod 16, immediately below the bushing member 23, is a fluid seal assembly 25, which is held in position by a retaining ring 26 secured in the guide member 22.

An annular end plate 27 is secured to the guide member 22 by means of bolts 28. The end plate 27 is formed with an overhanging peripheral portion 29 which is disposed in abutting engagement with the upper end of the cylinder 10. The end plate 27 is further provided with a radially inwardly extending ledge or flange portion 30 which serves as a guide for a plurality of split-ring scrapers 31, 32 and 33. The number of the split-ring scrapers may be increased or decreased as conditions of operation may require. At the upper end of the scrapers, an annular guide member 34 is provided which is held in position by means of a lock ring 35 secured within the end plate 27. Garter springs 36, 37 and 38 are disposed about the split-ring scrapers 31, 32 and 33 for biasing the latter into frictional engagement with the outer periphery of the piston rod 16. It will be understood that other forms of spring means may be employed in place of the garter springs 36, 37 and 38. It is to be observed that the spring loaded split-ring scrapers 31, 32 and 33 are floatingly mounted relative to the end plate 27 between the guides or flanges 30 and 34.

The spring loaded split-ring scrapers 31, 32 and 33 are preferably formed of a relatively soft metal bushing material and are provided with annular scraping edges adjacent their inner peripheries. In addition, the scrapers 31, 32 and 33 are formed, respectively, with a plurality of circumferentially spaced radially extending fluid passageways 39, 40 and 41 for conveying fluids and materials, collected at the scraping edges, to the outer periphery of the scrapers. Suitable axial fluid ports 42 are formed in the guide portion 30 of the end plate 27, which ports 42 communicate with an annular chamber 43 defined by the end plate 27 and the guide member 22. The chamber 43 communicates through diagonal passageways 44 with an annular chamber 45 defined by the cylinder 10 and the guide member 22. A port 46, formed in the cylinder 10 and communicating with the fluid chamber 45, has threaded therein a drain pipe 47 which is adapted to have communication with the sump tank of the fluid circuit (not shown) associated with the hydraulic piston and cylinder assembly hereinbefore described.

Suitable oil seal members 48 and 49 are secured, respectively, in the outer peripheries of the end plate 27 and the guide member 22 for preventing oil leakage therepast from the area 43. In addition, an annular flange 50 is secured within the end plate 27, at the upper end thereof, for preventing entrance of large particles of foreign material into the interior of the end plate 27. The flange member 50 at its inner periphery, is spaced slightly from the piston rod 16 thus permitting free movement of the latter.

In the operation of my above described invention, hydraulic fluid is admitted through the pipe 13 and port 12 into the interior of the lower end of the cylinder 10 for effecting upward movement of the piston head 17 and piston rod 16. During extension of the piston rod 16, a substantial portion of fluid which has collected on the periphery of the rod 16 is removed by the fluid seal assembly 25. The slight additional fluid, which remains on the periphery of the piston rod 16, is removed by the spring loaded split-ring scrapers 32 and 33 wherefrom fluid is directed to the sump tank of the fluid circuit through the fluid passageways 40 and 41 of the scrapers 32 and 33, the ports 42 in the guide member 30, the chamber 43, diagonal passageways 44, fluid chamber 45, and pipe 47. Since the fluid seal assembly 25 and scrapers 32 prevent the piston rod from carrying fluid out of the cylinder, the exposed portion of the piston rod does not have fluid thereon and thus does not have any special affinity for dirt and dust. Consequently, the collection of dirt and dust by the piston rod, as well as the collection of foreign material at the end of the cylinder during retraction of the piston rod, is substantially eliminated.

Now, should it be desired to retract the piston rod 16 within the cylinder 10, the hydraulic fluid is bled from the lower end of the cylinder 10 through the fluid port 12 and pipe 13. Simultaneously hydraulic fluid under pressure is directed through the pipe 15 into the interior of the cylinder 10 adjacent the upper end thereof, above the piston head assembly 17. The piston head 17 and the piston rod 16 are, accordingly, urged downwardly within the cylinder 10. It will be readily apparent to those skilled in the art that considerable foreign materials collect on that portion of the outer periphery of the piston rod 16 which projects outwardly of the cylinder 10. Such foreign materials may comprise abrasives, metal chips or corrosive agents. Now, as the piston rod 16 is urged downwardly, the upper spring loaded split-ring scraper 31 serves to scrape such foreign materials from the outer periphery of the piston rod 16 and to direct it to the sump tank of the fluid circuit through the fluid ports 39 formed in the scraper 31, the ports 42 formed in the guide member 30, fluid chamber 43, diagonal passageways 44, chamber 45, and drain pipe 47. At the sump tank, suitable filters are provided for removing the foreign materials, collected primarily at the upper scraper 31, from the actuating fluid, collected primarily at the lower scrapers 32 and 33, so as to permit the actuating fluid to be recirculated in the fluid circuit.

It will thus become apparent from the above description that I have provided suitable closure means for the piston rod end of the cylinder of a hydraulic piston and cylinder assembly which will prevent the leakage of hydraulic fluid out of the cylinder, and, which will, in turn, prevent the entrance of foreign materials into the cylinder.

Now, while I have shown and described what I believe to be a preferred embodiment of my present invention, it will be understood that various modifications and rearrangements may be made therein without departing from the spirit and scope of my present invention.

I claim:

1. For use with a cylinder and a piston rod extending therefrom, the combination of inner and outer annular closure means disposed in the cylinder about the piston rod, fluid seal means between the outer peripheries of the inner and outer closure means and the inner periphery of the cylinder, means for maintaining said inner and outer closure means in spaced apart relation whereby a first fluid chamber is defined therebetween, a second fluid chamber formed between the outer periphery of the inner closure means and the inner periphery of the cylinder, fluid seal means arranged about the outer periphery of the piston rod and retained in the inner end of said inner closure means, bushing means for guiding the piston rod and retained in the outer end of said inner closure means, a plurality of spring pressed split scraper rings arranged about the outer periphery of the piston rod and floatingly retained in the inner end of said outer closure means, a third fluid chamber about the outer periphery of said scraper rings, a drain port, passageway means interconnecting said first, second and third fluid chambers and said drain port, the inner one of said scraper rings being adapted to collect fluids from the periphery of the piston rod while the latter is being urged outwardly of the cylinder, the outer one of said scraper rings being adapted to collect fluids and foreign materials from the periphery of the piston rod while the latter is being urged inwardly of the cylinder, fluid passageways formed in said scraper rings for placing the fluid collecting edges thereof in communication with said third fluid chamber, a fourth fluid chamber about the piston rod at the outer end of said outer closure means, and said fourth chamber communicating with said third chamber through the fluid passageways formed in the outer scraper ring.

2. For use with a cylinder and a piston rod extending therefrom, the combination of inner and outer annular closure means disposed in the cylinder about the piston rod, said inner and outer closure means having a first fluid chamber defined therebetween, fluid seal means arranged about the outer periphery of the piston rod and retained in the inner end of said inner closure means, bushing means retained in the outer end of said inner closure means for guiding the piston rod, a plurality of spring pressed split scraper rings arranged about the outer periphery of the piston rod and floatingly retained in said outer closure means, a second fluid chamber about the outer periphery of said scraper rings, a drain port, passageway means interconnecting said first and second fluid chambers and said drain port, the inner one of said scraper rings being adapted to collect fluids from the periphery of the piston rod while the latter is being urged outwardly of the cylinder, the outer one of said scraper rings being adapted to collect fluids and foreign materials from the periphery of the piston rod while the latter is being urged inwardly of the cylinder, and fluid passageways formed in said scraper rings for placing the fluid collecting edges thereof in communication with said second fluid chamber.

References Cited in the file of this patent

UNITED STATES PATENTS

| | | |
|---|---|---|
| 849,115 | France | Apr. 2, 1907 |
| 2,324,206 | Golten | July 13, 1943 |
| 2,368,137 | Harmon | Jan. 30, 1945 |
| 2,443,312 | Geiger et al. | June 15, 1948 |
| 2,625,413 | Christensen | Jan. 13, 1953 |